United States Patent [19]

Honsinger et al.

[11] 4,286,188
[45] Aug. 25, 1981

[54] AMORPHOUS METAL HYSTERESIS MOTOR

[75] Inventors: Vernon B. Honsinger, Ballston Lake; Russell E. Tompkins, Scotia, both of N.Y.

[73] Assignee: General Electric Company, Schenectady, N.Y.

[21] Appl. No.: 914,445

[22] Filed: Jun. 12, 1978

[51] Int. Cl.³ .................... H02K 15/02; H02K 15/10; H02K 17/00
[52] U.S. Cl. .................................. 310/162; 148/121; 310/268
[58] Field of Search ................. 148/121; 29/598, 596; 310/162, 268

[56] References Cited

U.S. PATENT DOCUMENTS

| | | | |
|---|---|---|---|
| 3,061,750 | 10/1962 | Stegman | 310/268 |
| 3,069,577 | 12/1962 | Lee | 310/166 |
| 3,581,132 | 5/1971 | Laing | 310/166 |
| 3,728,786 | 4/1973 | Lucas et al. | 29/598 |
| 4,053,331 | 10/1977 | Graham et al. | 148/120 |
| 4,081,298 | 3/1968 | Mendelsohn et al. | 148/121 |
| 4,116,728 | 9/1978 | Becker et al. | 148/108 |

OTHER PUBLICATIONS

Honsinger, "Pancake Motors . . . (No. 51-R 9011)", Allis-Chalmers Electrical Rev., 1951. (No. 51-R 9011)

*Primary Examiner*—L. Dewayne Rutledge
*Assistant Examiner*—Upendra Roy
*Attorney, Agent, or Firm*—William H. Steinberg; James C. Davis, Jr.; Paul R. Webb, II

[57] ABSTRACT

A rotor is fabricated of a plurality of strips of thin amorphous metal wound side by side into adjacent coils about an axis, the flat sides of the strips being parallel to the axis. The rotor material is annealed to increase its coercive force to a value which may be up to 100 oersteds, rendering the rotor useful in a hysteresis type motor.

6 Claims, 3 Drawing Figures

AMORPHOUS METAL HYSTERESIS MOTOR

RELATED APPLICATIONS

This application is related to: application Ser. No. 914,190, filed concurrently herewith in the name of Thomas Anthony Lipo, entitled "Salient Pole Configuration For Use As A Reluctance Motor Employing Amorphous Metal";

Application Ser. No. 914,194 filed concurrently herewith in the names of Vernon Bertram Honsinger and Russell Edward Tompkins, entitled "Slotless Motor Design Using Amorphous Metal";

Application Ser. No. 914,446 filed concurrently herewith in the names of Vernon Bertram Honsinger and Russell Edward Tompkins, entitled "Stator Design for Induction and Hysteresis Motors Using Amorphous Metal Tape";

Application Ser. No. 914,443 filed concurrently herewith in the name of Gerald Burt Kliman, entitled "Induction Disk Motor With Amorphous Metal Tape"; and Application Ser. No. 914,191, filed concurrently herewith in the names of Gerald Burt Kliman and Allan Barr Plunkett, entitled "Synchronous Disk Motor With Amorphous Metal Stator and Permanenet Magnet Rotor and Flywheel", all of which are assigned to the instant assignee.

BACKGROUND OF THE INVENTION

This invention relates to hysteresis machines and more specifically to a hysteresis machine having a rotor comprising a coil of amorphous metal tape which has been annealed to increase its coercivity.

Hysteresis machines, such as motors, are well known self-starting synchronous machines employing the hysteresis properties of the rotor. The driving force is provided by the rotating stator field which magnetizes the rotor. If the power supply frequency remains constant, rotor speed remains constant even if there are changes, within limits, in applied voltage, ambient temperature and attached torque load. Moreover, the motor speed is not affected by manufacturing variations, within predetermined limits. Consequently, the hysteresis synchronous machine can be used in virtually any application requiring synchronous motors.

Torque developed by the motor is proportional to area of the rotor material hysteresis loop, while exciting current for the motor is determined by coercive force of the rotor material. Thus, a coercive force should be selected for a particular hysteresis machine application which balances exciting current against the available torque for the machine.

The cost of hysteresis motor rotor material is several dollars per pound at the present time. Use of less expensive material for the hysteresis motor would be desirable. Amorphous metals have recently become available which have good magnetic properties and have a potential cost of one-tenth that of metals now used for hysteresis motors. Amorphous metals, however, are not available in a form convenient for manufacture of conventional laminated rotors. Thus the metal is in the form of a tape which is about 0.0005 to 0.003 inch thick and in widths of up to about 2 inches. The amorphous metal tape also has very low coercive force, of the order of from 0.01 to 0.1 oersteds.

Amorphous metal tapes having magnetic properties desired for application to electric machines are disclosed in U.S. Pat. Nos. 3,856,513, dated Dec. 24, 1974, in the name of Chen et al; 3,881,542, dated May 6, 1975, in the name of Polk et al; 4,052,201, dated Oct. 4, 1977, in the name of Polk et al; 4,059,441, dated Nov. 22, 1977, in the name of Ray et al. and 4,067,732, dated Jan. 10, 1978, in the name of Ray. A survey of metal glass technology is given in the article "Metallic Glasses" by John J. Gilman, appearing in *Physics Today*, May 1975, pages 46 to 53. Some attempts are being made to exploit the advantages of the properties of these metal tapes, for example, for acoustic devices as shown in U.S. Pat. No. 3,838,365.

An object of the present invention is to provide a low cost hysteresis machine which employs a coil of amorphous metal tapes as the rotor, the coil being annealed to substantially increase its coercive force.

BRIEF DESCRIPTION OF THE PRESENT INVENTION

In accordance with the present invention, a hysteresis machine rotor is made of a coil of amorphous metal tapes. The rotor can be wound in either a single continuous strip or a plurality of parallel overlapping strips, since the machine is a synchronous machine and there are no induced rotor currents. Several substantially identical coils may be wound side by side. The amorphous metal tapes are annealed after winding into the coil form, at a suitable temperature for a suitable length of time, up to the point where crystallization of the alloy starts and its coercive force begins to increase. By annealing the tapes, coercive force values ranging from 0.02 to 100 oersteds can be obtained, making the coil useful for hysteresis machine applications.

DETAILED DESCRIPTION OF THE DRAWINGS

Figure 1:
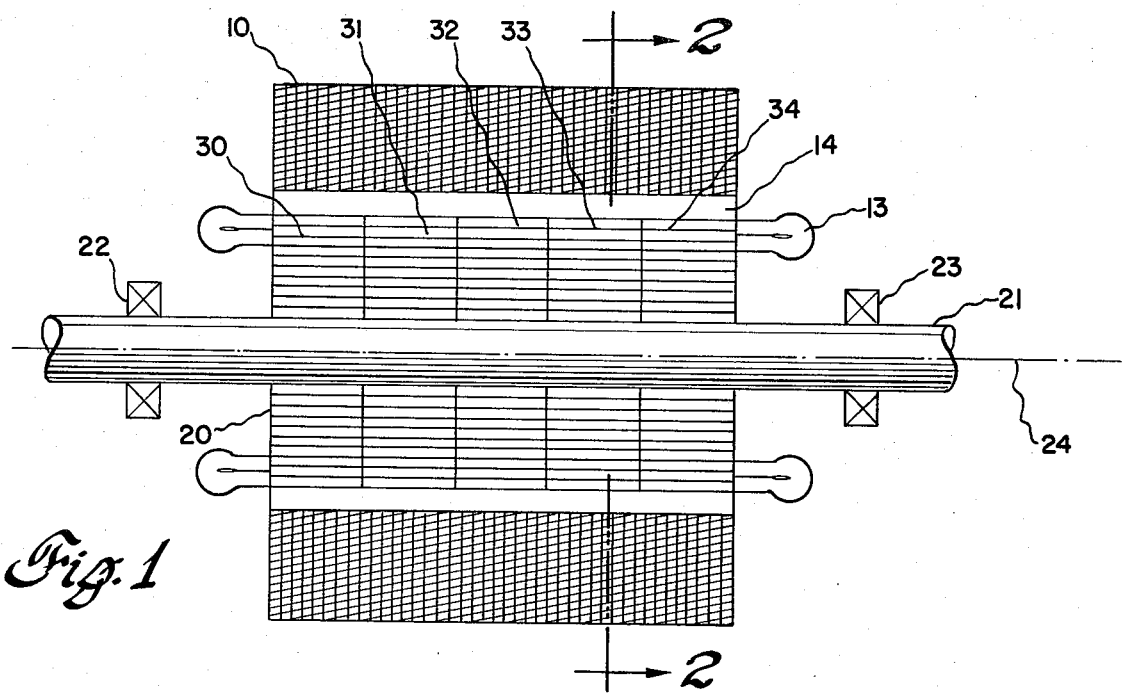
FIG. 1 is a cross-sectional view taken along the axis of a schematically illustrated hysteresis motor fabricated in accordance with the present invention.
Figure 2:
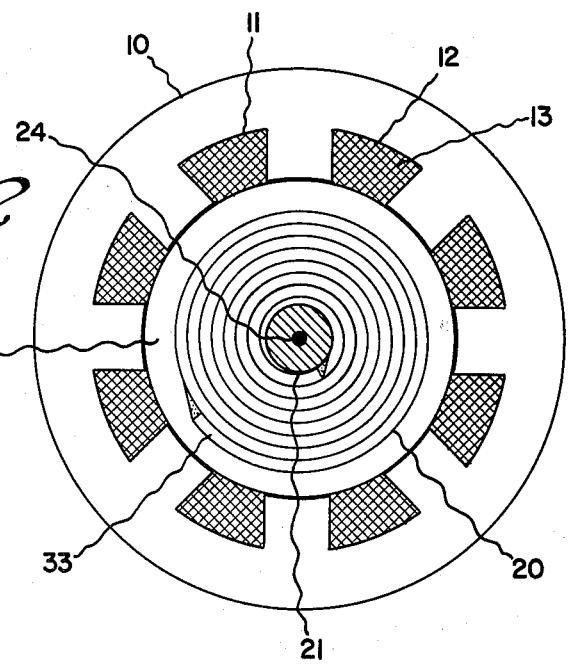
FIG. 2 is a cross-sectional view of FIG. 1 taken across the section line 2—2 in FIG. 1.

Referring now to FIGS. 1 and 2, there is schematically illustrated therein a typical hysteresis motor (without housing, supports, or the like) which may be of a general configuration well known in the art. The basic motor structure shown in FIG. 1 comprises a conventional stator 10 which includes a stack of conventional laminations containing stator winding slots, such as slots 11 and 12, which receive a conventional stator winding 13 operable to produce a rotating field.

A rotor 20, described more fully hereinafter, is provided with a shaft 21 which may be carried in suitable bearings 22 and 23 which are fixed with respect to the housing (not shown) supporting rotor 20 and stator 10. The outer diameter of rotor 20 is separated from the inner diameter of the stator 10 by a fixed radial gap 14.

In accordance with the present invention, rotor 20 is formed of a plurality of coils of an amorphous metal strip having a thickness of about 0.002 inch, each coil comprising a total length of about 1.0 inches. Each coil may be formed of a single strip of tape wound on shaft 21 such that its flat sides are parallel to shaft axis 24 and may have an inner diameter of ½ inches and an outer diameter of 2.0 inches, so as to comprise 375 turns of 0.002 inch thick tape. If a larger power factor is desired, two or more elongated strips laid one on top of another so as to introduce capacitance into the rotor circuit may be simultaneously wound to form the coil 20. This capacitance introduction by interwinding amorphous metal tapes in a motor is described and claimed in T. R. Haller application Ser. No. 914,446 filed concurrently herewith and assigned to the instant assignee.

FIG. 1 illustrates five individual reels 30 to 34 which are disposed parallel to one another for forming a rotor having a length greater than the available width of a single tape. Since the amorphous metal tape is coated with an electrically insulating oxide film, side-by-side contact between adjacent ones of coils 30–34 does not result in an electrical path therebetween. Rotor eddy currents are thereby attenuated, resulting in reduced rotor eddy current losses. After the rotor 20 has been formed in its coil shape and the ends of the coils have been secured to prevent unraveling, the entire rotor 20 may be annealed in order to increase the coercive force of the rotor.

The coercive force of the metal tapes forming rotor 20 before annealing may be of the order of about 0.01 oersteds. By annealing the tapes, the coercive force can be increased at least to about 0.02 oersteds and up to approximately 100 oersteds. As a specific example, when the tape comprises the alloy $Fe_{40}Ni_{40}P_{14}B_6$, we have measured the starting coercive force of the coil to be about 0.015 oersteds after the coil is formed. After this coil is annealed for 120 minutes at 390° C., we have found that the coercive force of the material increases to about 50 oersteds. Even higher coercive force can be obtained by longer heating and/or by using a higher annealing temperature. Saturation magnetization of this alloy is about 8,000 gauss. Other alloys using higher or lower saturations could also be used.

Other alloy materials having other saturation magnetizations also experience an increase in coercive force when they are partly crystallized. Thus, the alloy $Fe_{40}Ni_{40}B_{20}$ has a saturation magnetization of about 10,000 gauss while the alloy $Fe_{80}B_{20}$ has a saturation magnetization of about 16,000 gauss. These amorphous metal strip alloys, when partially crystallized, show about the same increase in coercive force as $Fe_{40}Ni_{40}P_{14}B_6$.

The increase in coercive force during annealing is a general phenomenon exhibited by amorphous metal alloys of the general class $(TM)_{80\pm10}(G)_{20\pm10}$, where TM is any of the transition metals and their alloys Fe, Co and Ni, and G is the glass forming atoms usually comprising the metalloids P, B, C, S, Si and Al.

Figure 3:
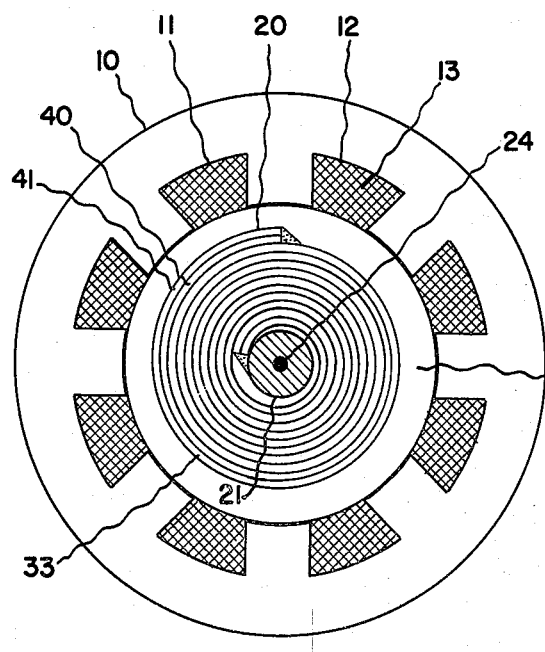
FIG. 3 is a cross-sectional view of another embodiment of the hysteresis motor of the present invention.

In the embodiment of FIG. 3, which is a view similar to that shown in FIG. 2, each of the coils 30–34 in a rotor such as illustrated in FIG. 1 comprises a pair of amorphous metal tapes 40 and 41 would together about longitudinal axis 24 such that a flat side of tape 40 contacts a flat side of tape 41, and the flat sides of both tapes are parallel to axis 24. The remaining portion of the structure shown in FIG. 3 is identical to that shown in FIG. 2, with like numerals designating like components.

Thus, in accordance with the present invention, the magnetization of a machine rotor is controlled by suitable choice of alloy used in the rotor, and the coercive force of the alloy can be controlled by heat treatment to yield a high quality, low cost rotor structure for a hysteresis machine.

Although the present invention has been described in connection with only certain preferred features thereof, many variations and modifications will now become apparent to those skilled in the art. It is, therefore, to be understood that the appended claims are intended to cover all such variations and modifications as fall within the true spirit of the invention.

What is claimed is:

1. A hysteresis machine comprising: a stator structure having a central opening and having a central axis and stator winding means for producing a rotating magnetic field which rotates about said central axis; and a rotor structure positioned within said central opening in said stator structure and within said rotating magnetic field and being rotatable relative to said stator structure about said central axis, said rotor structure comprising a plurality of adjacent coils of amorphous metal tape wound substantially concentrically about said axis so as to collectively define a rotating magnetic body having the hysteretic properties of a hysteresis machine rotor, each coil comprised of a plurality of turns of tape and each tape having its flat sides parallel to the rotor axis.

2. The machine of claim 1 wherein each of said coils of amorphous metal tape is annealed and exhibits a coercive force greater than about 0.02 oersteds.

3. The machine of claim 1 wherein said rotor includes a rotatable shaft extending therefrom coaxially with said axis and fixed to said coils.

4. The machine of claim 3 wherein each of said coils is annealed and exhibits a coercive force in the range of about 0.02 oersteds to about 100 oersteds.

5. The machine of claim 2 wherein said amorphous metal tape is an alloy of the general class $(TM)_{80\pm10}(G)_{20\pm10}$ wherein (TM) comprises one of the group consisting of the transition metals and their alloys and (G) comprises one of the group consisting of the glass forming elements, including the metalloids P, B, C, S, Si and Al.

6. The machine of claims 1 or 2 wherein each of said coils of amorphous metal tape comprises a plurality of individual tapes, each of said individual tapes having a flat side in contact with a flat side of another of said individual tapes.

* * * * *